US012529510B2

(12) United States Patent
Jeong et al.

(10) Patent No.: US 12,529,510 B2
(45) Date of Patent: Jan. 20, 2026

(54) REFRIGERATOR

(71) Applicant: SAMSUNG ELECTRONICS CO., LTD., Suwon-si (KR)

(72) Inventors: Jin Jeong, Suwon-si (KR); Juno Kwon, Suwon-si (KR); Bongsu Son, Suwon-si (KR); Kwanyeol Lee, Suwon-si (KR); Seokjun Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 18/385,718

(22) Filed: Oct. 31, 2023

(65) Prior Publication Data

US 2024/0077249 A1 Mar. 7, 2024

Related U.S. Application Data

(63) Continuation of application No. PCT/KR2022/010617, filed on Jul. 20, 2022.

(30) Foreign Application Priority Data

Aug. 4, 2021 (KR) ........................ 10-2021-0102492

(51) Int. Cl.
*F25D 23/12* (2006.01)
*B67D 1/12* (2006.01)
(Continued)

(52) U.S. Cl.
CPC ......... *F25D 23/126* (2013.01); *B67D 1/1238* (2013.01); *F25D 23/025* (2013.01);
(Continued)

(58) Field of Classification Search
CPC .. F25D 2323/023; F25D 23/025; F25D 29/00; B67D 1/1238; B67D 2210/00036
See application file for complete search history.

(56) References Cited

U.S. PATENT DOCUMENTS 8,438,871 B2 5/2013 Kwon
8,745,992 B2 6/2014 Cheong et al.
(Continued)

FOREIGN PATENT DOCUMENTS

CN 110945303 A 3/2020
EP 2 444 761 A2 4/2012
(Continued)

OTHER PUBLICATIONS

KR-20110068412-A Translation (Year: 2011).*
(Continued)

*Primary Examiner* — David J Teitelbaum
(74) *Attorney, Agent, or Firm* — Sughrue Mion, PLLC

(57) ABSTRACT

A refrigerator includes: a main body including a storage compartment; an inner door rotatably coupled to the main body; an outer door rotatably coupled to a front of the inner door; a dispenser provided in the inner door and configured to supply water; and a water supply device provided in the inner door, and configured to supply a predetermined amount of water to a container, the water supply device including a sensor configured to detect a level of the water in the container, wherein the outer door may include: a door body including a dispenser opening configured to expose the dispenser in a state in which the outer door at least partially covers the inner door; and a door panel detachably mounted on the door body.

14 Claims, 15 Drawing Sheets

(51) Int. Cl.
*F25D 23/02* (2006.01)
*F25D 29/00* (2006.01)

(52) U.S. Cl.
CPC .... *F25D 29/00* (2013.01); *B67D 2210/00036* (2013.01); *F25D 2323/023* (2013.01)

(56) References Cited

U.S. PATENT DOCUMENTS

| | | | | |
|---|---|---|---|---|
| 8,875,538 | B2 | 11/2014 | Lee et al. | |
| 10,260,790 | B2 | 4/2019 | Hottenroth et al. | |
| 10,605,517 | B2 | 3/2020 | Eicher et al. | |
| 10,663,207 | B2 | 5/2020 | Jeong et al. | |
| 10,900,710 | B2 | 1/2021 | Kim et al. | |
| 10,995,978 | B2 | 5/2021 | Lee et al. | |
| 11,079,164 | B2 | 8/2021 | Jeong et al. | |
| 11,313,615 | B2 | 4/2022 | Park et al. | |
| 11,674,747 | B2 | 6/2023 | Kwon et al. | |
| 2009/0183796 | A1* | 7/2009 | Chase | B67D 1/001 141/95 |
| 2012/0096872 | A1* | 4/2012 | Cheong | F25D 23/025 62/340 |
| 2017/0188721 | A1* | 7/2017 | Park | F21V 15/01 |
| 2018/0118548 | A1* | 5/2018 | Lux | B67D 1/0004 |
| 2018/0202705 | A1* | 7/2018 | Eicher | B67D 3/0009 |
| 2019/0330045 | A1* | 10/2019 | Breault | B67D 1/0058 |
| 2020/0191470 | A1* | 6/2020 | Park | F25D 23/028 |
| 2022/0090852 | A1 | 3/2022 | Park et al. | |
| 2023/0015806 | A1 | 1/2023 | Lee et al. | |
| 2023/0304716 | A1 | 9/2023 | Lee et al. | |

FOREIGN PATENT DOCUMENTS

| | | | | |
|---|---|---|---|---|
| KR | 10-0488074 | B1 | | 5/2005 |
| KR | 10-0690158 | B1 | | 3/2007 |
| KR | 10-2010-0122230 | A | | 11/2010 |
| KR | 20110068412 | | * | 6/2011 |
| KR | 10-2012-0040891 | A | | 4/2012 |
| KR | 10-2018-0057717 | A | | 5/2018 |
| KR | 10-2018-0126835 | A | | 11/2018 |
| KR | 10-2020-0074500 | A | | 6/2020 |
| KR | 10-2139502 | B1 | | 7/2020 |
| KR | 10-2021-0071914 | A | | 6/2021 |
| KR | 10-2497711 | B1 | | 2/2023 |
| WO | 2018/128316 | A1 | | 7/2018 |

OTHER PUBLICATIONS

Communication issued Oct. 9, 2024 by the European Patent Office in European Patent Application No. 22853310.5.
International Search Report (PCT/ISA/210) issued Nov. 15, 2022 by the International Searching Authority in International Patent Application No. PCT/KR2022/010617.
Written Opinion (PCT/ISA/237) issued Nov. 15, 2022 by the International Searching Authority in International Patent Application No. PCT/KR2022/010617.

* cited by examiner

REFRIGERATOR

CROSS-REFERENCE TO RELATED APPLICATIONS

This application is a continuation of International Application No. PCT/KR2022/010617, filed on Jul. 20, 2022, in the Korean Intellectual Property Receiving Office, which is based on and claims priority to Korean Patent Application No. 10-2021-0102492, filed on Aug. 4, 2021, in the Korean Intellectual Property Office, the disclosures of which are incorporated herein by reference in their entireties.

BACKGROUND

1. Field

The disclosure relates to a refrigerator, and more specifically, to a refrigerator equipped with a dispenser on a double door.

2. Description of Related Art

A refrigerator is an apparatus including a main body having a storage compartment and a cold air supply system for supplying cold air to the storage compartment, thereby keeping food fresh. The storage compartment includes a refrigerating compartment for storing food in a refrigerated state by maintaining a temperature at about 0 to 5 degrees Celsius, and a freezing compartment for storing food in a frozen state by maintaining a temperature at about 0 to minus 30 degrees Celsius. Generally, the front of the storage compartment is open for the loading and unloading of food, and the open front of the storage compartment is opened and closed by a door.

A refrigerator may be equipped with a dispenser configured to provide water to the outside of the refrigerator by manipulation of an operation lever without opening a door.

The dispenser may require a user to press and hold an operation lever to discharge water. Therefore, the user may not receive a large amount of water at once, and thus needs to keep pressing the operation lever until a desired amount water is dispensed into a container.

SUMMARY

Provided is a refrigerator in which a design of a door may be changed.

Further, provided is a refrigerator that may prevent an edge of a door panel from being separated from a door body when the door panel is fixed to the door body.

Further still, provided is a refrigerator including an automatic water supply device with improved usability.

Additional aspects will be set forth in part in the description which follows and, in part, will be apparent from the description, or may be learned by practice of the presented embodiments.

According to an aspect of the disclosure, a refrigerator includes: a main body including a storage compartment; an inner door rotatably coupled to the main body; an outer door rotatably coupled to a front of the inner door; a dispenser provided in the inner door and configured to supply water; and a water supply device provided in the inner door, and configured to supply a predetermined amount of water to a container, the water supply device including a sensor configured to detect a level of the water in the container, wherein the outer door may include: a door body including a dispenser opening configured to expose the dispenser in a state in which the outer door at least partially covers the inner door; and a door panel detachably mounted on the door body.

The door panel is configured to at least partially cover the dispenser opening.

The outer door may further include a dispenser insulator removably provided in the dispenser opening.

The door panel may include a panel opening corresponding to the dispenser opening.

The door body may further include a body coupling portion provided on an inner circumferential surface of the dispenser opening, and the door panel may further include an opening coupling portion including a coupling groove configured to accommodate the body coupling portion in a state in which the door panel is mounted on the door body.

The door body may further include a body coupling portion provided on an inner circumferential surface of the dispenser opening and having a coupling hole, and the door panel may further include an opening coupling portion including a deformable material and configured to be inserted into the coupling hole in the state in which the door panel is mounted on the door body.

The door panel may further include an opening coupling portion extending along an edge of the panel opening and including a magnetic material, and the door body may further include a cover, the opening coupling portion being fixed to the cover by a magnetic force.

The door body may further include a dispenser gasket provided on a surface facing the inner door along an edge of the dispenser opening.

The door body may further include a panel gasket on a surface facing the door panel along an edge of the dispenser opening.

The dispenser and the water supply device are accessible in a state in which the outer door is opened and the inner door is closed.

The refrigerator may further include a control valve configured to guide water supplied from an external source to the dispenser or to the water supply device.

The refrigerator may further include: a tray configured to collect water overflowing from the container; and an overflow sensor configured to detect a water level of the tray.

The door panel may include an upper trim protruding toward the door body, and the door body may further include an upper coupling space configured to accommodate the upper trim in a state in which the door panel is mounted on the door body.

The outer door may further include a fixing cover configured to be coupled to the upper trim in the upper coupling space in a state in which the door panel is mounted on the door body.

The fixing cover may be detachably coupled to the outer door.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
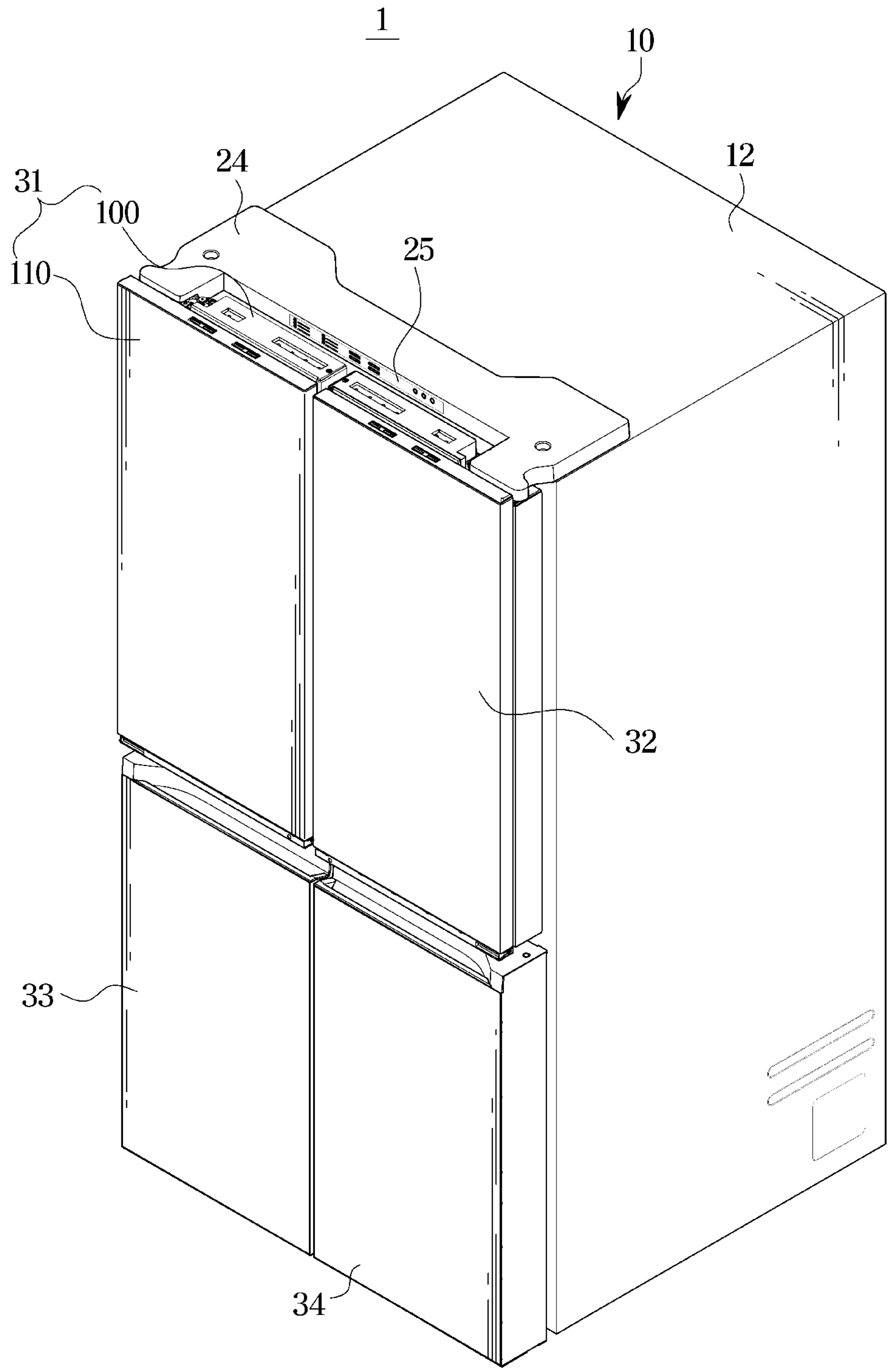
FIG. 1 illustrates an exterior of a refrigerator, according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

The singular expressions lay include plural expressions, unless the context clearly dictates otherwise. The terms “comprises” and “has” intended to indicate that there are features, numbers, steps, operations, components, parts, or combinations thereof described in the specification, and do not exclude the presence or addition of one or more other features, numbers, steps, operations, components, parts, or combinations thereof.

Ordinal expressions such as “first” and “second” are used to distinguish a plurality of components, and the ordinal numbers used do not indicate the arrangement order, manufacturing order, or importance between the components.

The terms “front,” “rear,” “upper portion,” “lower portion,” “upper end,” and “lower end” used in the following description are defined with reference to the drawings, and the shape and position of each component are not limited by these terms.

Hereinafter, various embodiments according to the present disclosure will be described in detail with reference to the accompanying drawings.

Figure 2:
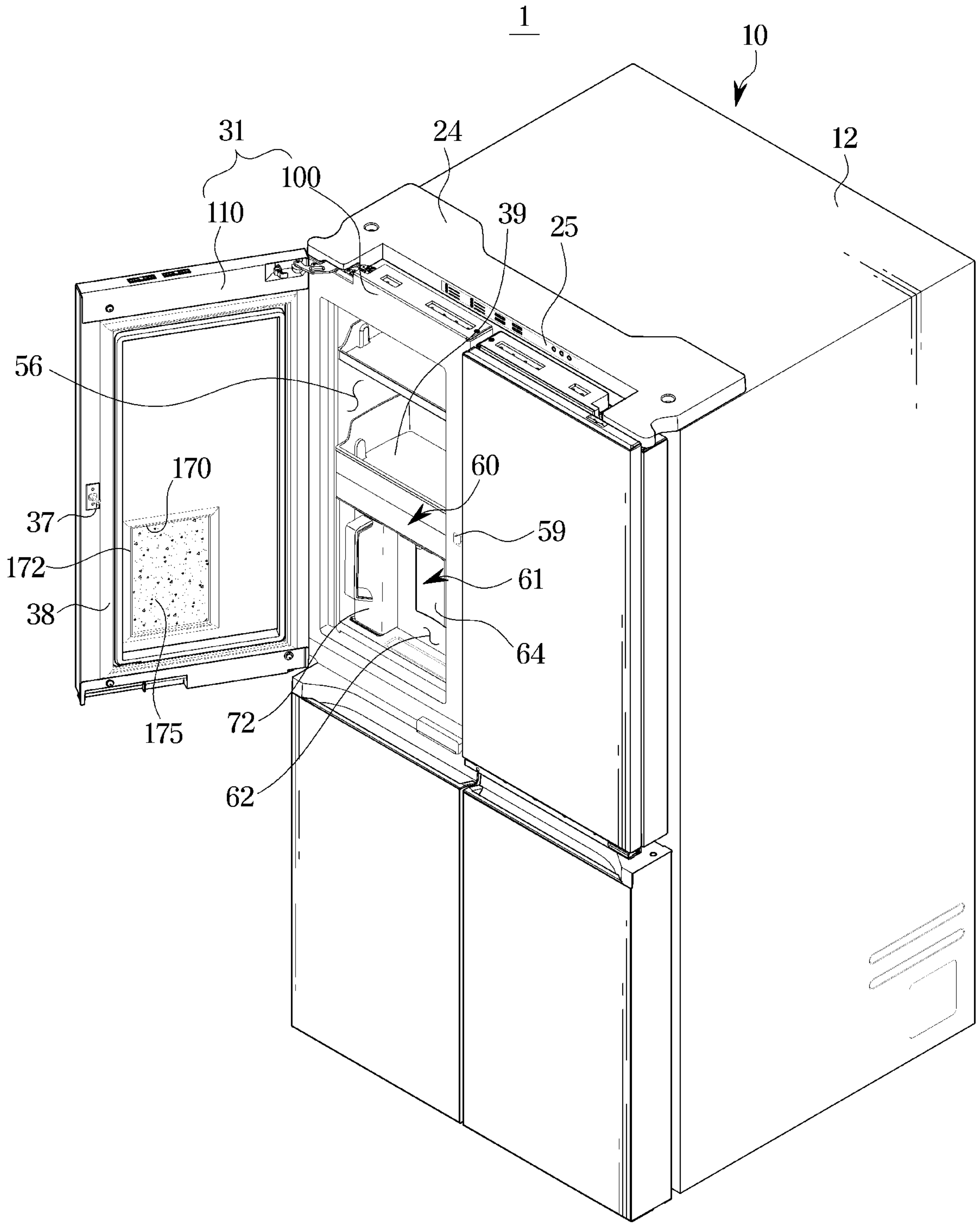
FIG. 2 illustrates an outer door of the refrigerator in an opened state, according to an embodiment.
Figure 3:
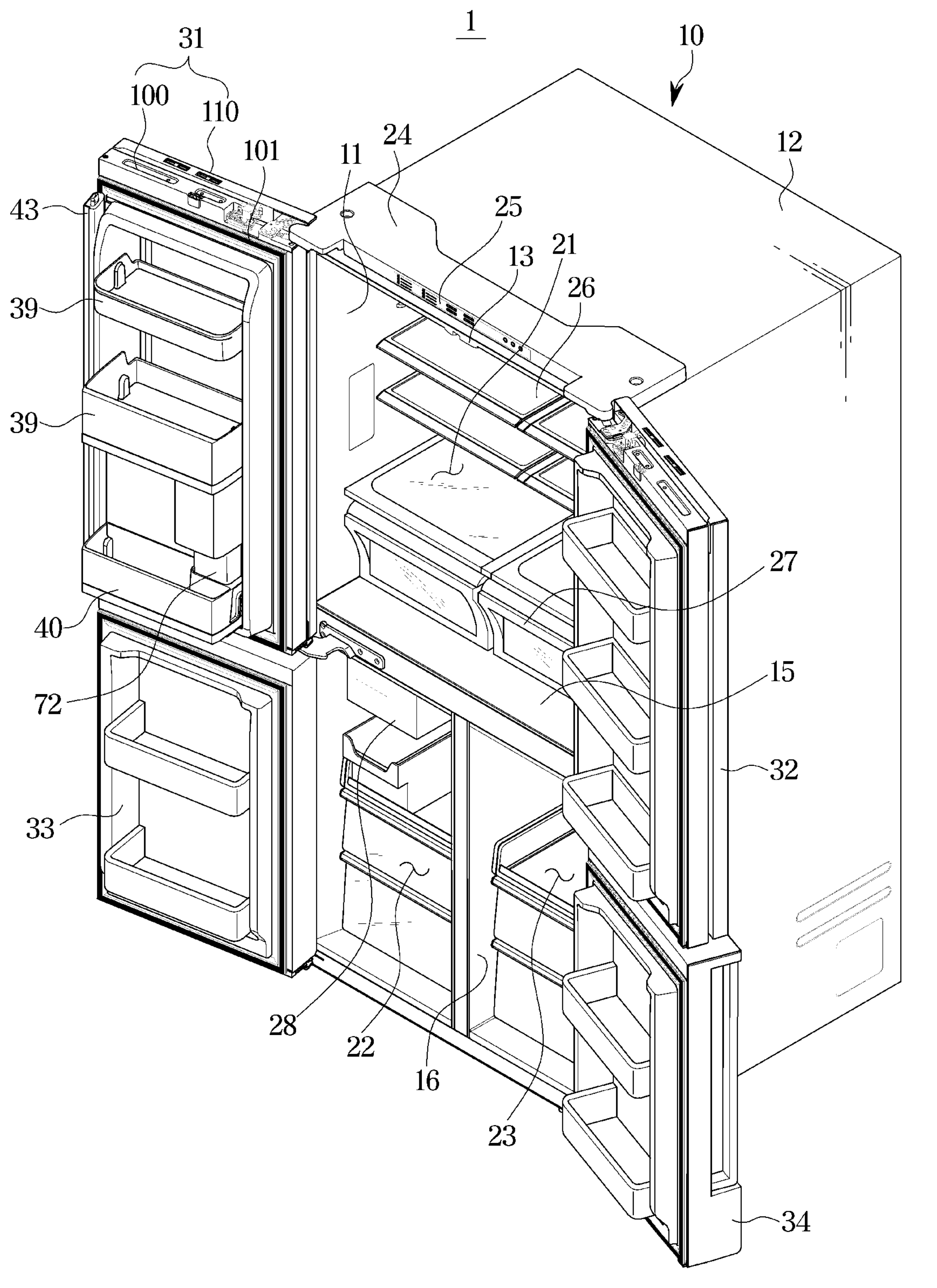
FIG. 3 illustrates inner doors of the refrigerator in an opened state, according to an embodiment.
Figure 4:
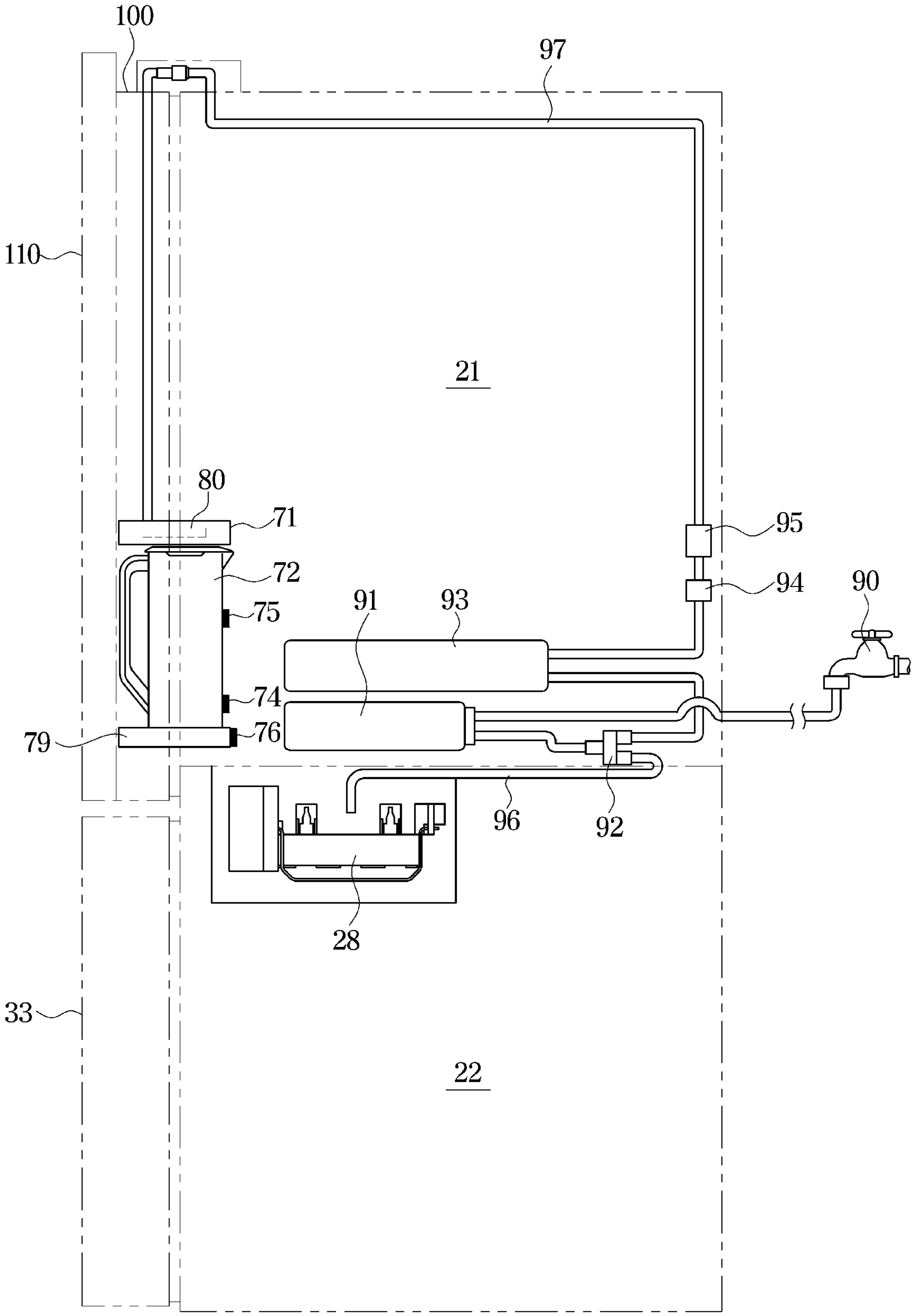
FIG. 4 illustrates a water supply flow path of the refrigerator, according to an embodiment.
Figure 5:
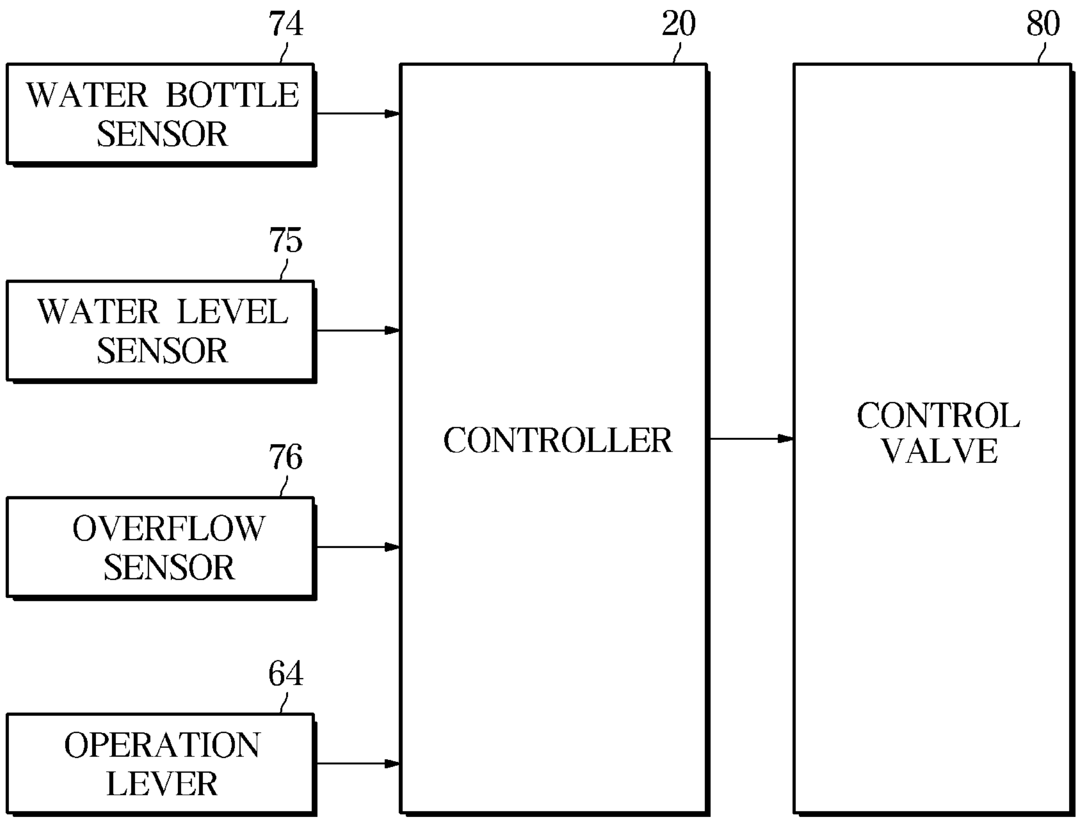
FIG. 5 illustrates a control block diagram of the refrigerator, according to an embodiment.
Figure 6:
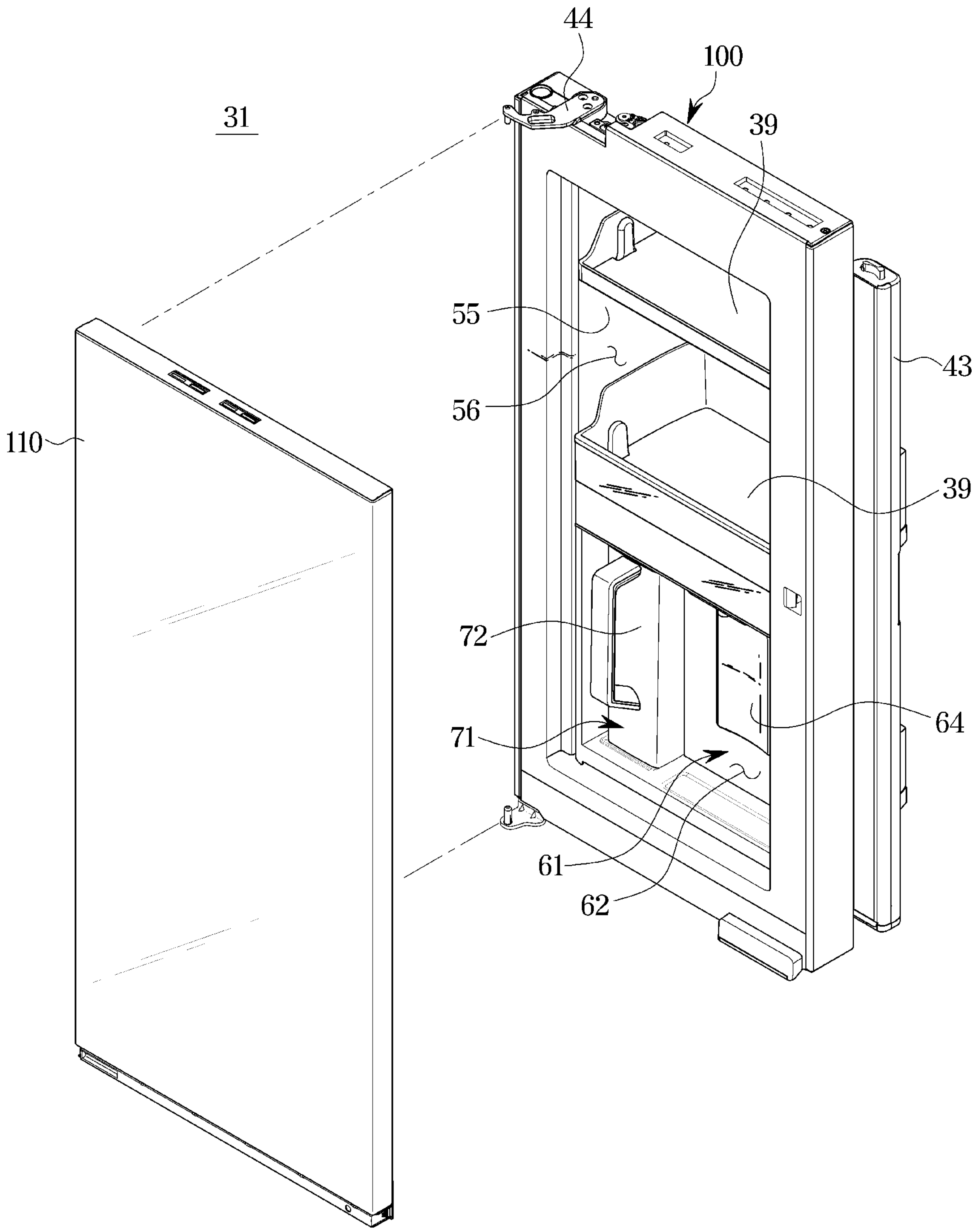
FIG. 6 illustrates the outer door and one of the inner doors of the refrigerator, according to an embodiment.

FIG. 1 illustrates an exterior of a refrigerator, according to an embodiment. FIG. 2 illustrates an outer door of the refrigerator in an opened state, according to an embodiment. FIG. 3 illustrates inner doors of the refrigerator in an opened state, according to an embodiment. FIG. 4 schematically illustrates a water supply flow path of the refrigerator, according to an embodiment. FIG. 5 illustrates a control block diagram of the refrigerator, according to an embodiment. FIG. 6 illustrates the outer door and one of the inner doors of the refrigerator, according to an embodiment.

Referring to FIGS. 1 to 6, a refrigerator 1, according to an embodiment, may include a main body 10, storage compartments 21, 22, and 23 formed inside the main body 10, doors 31, 32, 33, and 34 provided to open and close the storage compartments 21, 22, and 23, and a cold air supply device provided to supply cold air to the storage compartments 21, 22, and 23.

The main body 10 may include an inner case 11 forming the storage compartments 21, 22, and 23, an outer case 12 coupled to the outside of the inner case 11 to form an exterior, and an insulator provided between the inner case 11 and the outer case 12 to insulate the storage compartments 21, 22, and 23.

A top cover 24 may be coupled to an upper surface of the main body 10. The top cover 24 may be provided to cover hinges and various electrical components disposed on the upper surface of the main body 10. A control panel 25 may be provided on a front surface of the top cover 24 to display various status and operation information of the refrigerator 1 or to input various commands for operating the refrigerator 1.

A plurality of the storage compartments 21, 22, and 23 may be divided by a horizontal partition 15 and a vertical partition 16. The storage compartments 21, 22, and 23 may be divided into the upper storage compartment 21 and the lower storage compartments 22 and 23 by the horizontal partition wall 15, and the lower storage compartments 22 and 23 may be divided into the left lower storage compartment 22 and the right lower storage compartment 23 by the vertical partition 16.

The upper storage compartment 21 may be used as a refrigerating compartment, and the lower storage compartments 22 and 23 may be used as freezing compartment. However, the division and use of the storage compartments 21, 22, and 23 as described above is only an example and is not limited thereto.

In addition, the refrigerator may be a side by side (SBS) type in which the storage compartment is divided into left and right sides by a vertical partition, a French door refrigerator (FDR) type in which the storage compartment is divided into an upper refrigerating compartment and a lower refrigerating compartment by a horizontal partition wall, or a one-door type having one storage compartment and one door.

Inside the storage compartments 21, 22, and 23, shelves 26 on which foods are placed and storage containers 27 on which foods are stored may be provided.

The cold air supply device may generate cold air using a cooling circulation cycle in which a refrigerant is compressed, condensed, expanded, and evaporated, and supply the generated cold air to the storage compartments 21, 22, and 23.

The upper storage compartment 21 may be opened and closed by a pair of the doors 31 and 32. The doors 31 and 32 may be rotatably coupled to the main body 10. A pillar 43 may be provided on any of the doors 31 and 32 to prevent cold air in the storage compartment 21 from leaking between the pair of doors 31 and 32 when the pair of doors 31 and 32 are closed. The pillar 43 may be guided by a pillar guide 13 provided in the main body 10.

The lower left storage compartment 22 may be opened and closed by the door 33, and the door 33 may be rotatably coupled to the main body 10. The lower right storage compartment 23 may be opened and closed by the door 34, and the door 34 may be rotatably coupled to the main body 10.

The doors 31, 32, 33, and 34 may include door baskets 39 and 40 having a door storage space for storing foods. Inner door gaskets 101 configured to contact a front surface of the main body 10 may be provided on back surfaces of the doors 31, 32, 33, and 34 to seal the storage compartments 21, 22, and 23.

At least one of the doors 31, 32, 33, and 34 may be configured as a double door having an inner door 100 and an outer door 110. For example, the upper left door 31 may include the inner door 100 and the outer door 110.

The inner door 100 may be rotatably coupled to the main body 10 through a hinge. The inner door 100 may have a door interior space 56. The door interior space 56 may be formed in a central portion of the inner door 100 excluding an edge portion. The door interior space 56 may be formed to extend between front and back surfaces of the inner door 100. Therefore, when the inner door 100 is closed, the door interior space 56 may communicate with the storage compartment 21.

The outer door 110 may be configured to open and close the door interior space 56 of the inner door 100. An outer door gasket 38 may be provided on a back surface of the outer door 110 to seal the door interior space 56. The outer door gasket 38 may contact a front surface of the inner door 100 around the door interior space 56.

The outer door 110 may include a dispenser opening 170 formed to expose a dispenser 61. The outer door 110 may include a dispenser gasket 172 provided on a surface facing the inner door 100. The dispenser gasket 172 may extend along a circumference of the dispenser opening 170.

When the outer door 110 is opened, the inner door space 56 of the inner door 100 may be accessed. The outer door 110 may be rotatably coupled to the inner door 100 through a hinge 44 (FIG. 6). The outer door 110 may rotate in the same direction as the inner door 100. The outer door 110 may have a size corresponding to a size of the inner door 100. The outer door 110 may cover an entire area of the inner door 100.

The outer door 110 may be provided with a latch 37 to be fixed with the inner door 100, and the inner door 100 may be provided with a catch 59 to be engaged with the latch 37.

When the outer door 110 is opened and the latch 37 and the catch 59 are engaged, the outer door 110 and the inner door 100 may be opened together, and when the outer door 110 is opened and the latch 37 and the catch 59 are not engaged, only the outer door 110 may be opened and the inner door 100 may not be opened.

The door baskets 39 and 40 may be mounted in the door interior space 56.

The dispenser 61 may be provided in the door interior space 56. The dispenser 61 may include an operation lever 64 to operate the dispenser 61 and to dispense water. A user may press the operation lever 64 using a container such as a cup.

The dispenser 61 may include a water intake space 62 in which a container may be placed. The water intake space 62 may be recessed from a front surface of a water supply case 60. The water supply case 60 may be mounted in the door interior space 56.

A space in which a water bottle 72 may be mounted may be formed in the door interior space 56. The door interior space 56 may include an automatic water supply device 71 including a water level sensor 75 to detect a water level of the water bottle 72 when the water bottle 72 is mounted. The automatic water supply device 71 may include an outlet to supply water to the water bottle 72. The water level sensor 75 may be installed in the water supply case 60.

The automatic water supply device 71 may automatically supply water to the water bottle 72 so that a predetermined amount of water is filled in the water bottle 72 when the water bottle 72 is mounted. That is, the automatic water supply device 71 may perform an auto-fill function. The predetermined amount of water may be substantially a full amount of water in the water bottle 72.

A tray 79 may be provided in the door interior space 56. The tray 79 may store water flowing out of the water bottle 72. The tray 79 may collect water overflowing from the water bottle 72 when water is excessively supplied to the water bottle 72 and overflows from the water bottle 72. The tray 79 may be provided with an overflow sensor 76 to detect water collected in the tray 79. The overflow sensor 76 may transmit a signal for controlling a control valve 80 to a controller 20 to block water supply to the water bottle 72 when detecting that the predetermined amount of water has been collected in the tray 79.

The dispenser 61, the automatic water supply device 71, and the water supply case 60 may be configured as one assembly. The dispenser 61, the automatic water supply device 71, and the water supply case 60 may be disposed in the door interior space 56 of the inner door 100. Specifically, the water supply case 60 may be mounted on a door inner side surface 55 forming the door interior space 56.

As described above, because the door interior space 56 communicates with the storage compartment 21 when the inner door 100 is closed, the dispenser 61 and the automatic water supply device 71 may be cooled by cold air in the storage compartment 21. In addition, the dispenser 61 and the water bottle 72 may be disposed on a front surface of the water supply case 60. Therefore, the dispenser 61 and the water bottle 72 may be accessed in a state in which the inner door 100 is closed.

As illustrated in FIG. 4, the refrigerator 1 may include a water filter 91 and a water tank 93. The water filter 91 may purify water supplied from an external water supply source 90. The water tank 93 may store water purified through the water filter 91. The water tank 93 may be cooled by cold air in the storage compartment 21.

An ice maker 28 may be provided to make ice in the storage compartment 22 of the refrigerator 1. The ice maker 28 may make ice using cold air in the storage compartment 22.

The refrigerator 1 may include a water supply flow path 97 to connect the external water supply source 90 and the control valve 80 to supply water to the dispenser 61 and the automatic water supply device 71, and an ice maker flow path 96 to connect the external water supply source 90 and the ice maker 28 to supply water to the ice maker.

The ice maker flow path 96 and the water supply flow path 97 may form a branch at one point, and a flow path switching valve 92 may be provided at the branch point such that water supplied from the external water supply source 90 is selectively supplied to the control valve 80 or the ice maker 28. Water in the external water supply source 90 may be supplied to the control valve 80 or the ice maker 28 by a water pressure of the external water supply source 90 and control of the flow path switching valve 92.

The water supply flow path 97 may be provided to pass through the water filter 91. Therefore, the water in the external water supply source 90 may be purified through the water filter 91 and then supplied to the control valve 80. The water supply flow path 97 may be provided to pass through the water tank 93. Therefore, the water in the external water supply source 90 may be cooled in the water tank 93 and then supplied to the control valve 80.

A water valve 94 may be provided in the water supply flow path 97. The water valve 94 may adjust an amount of water to be supplied from the water tank 93 to the control valve 80. A flow sensor 95 is provided in the water supply flow path 97 to measure an amount of water supplied to the control valve 80.

The ice maker flow path 96 may be provided to pass through the water filter 91. Therefore, the water in the external water supply source 90 may be purified through the water filter 91 and then supplied to the ice maker 28. Because water supplied to the ice maker 28 is cooled in the ice maker 28 even when the water is not cooled in the water tank 93, the ice maker flow path 96 may not pass through the water tank 93.

Referring to FIGS. 4 and 5, the refrigerator 1 may include a water bottle sensor 74 to detect whether the water bottle 72 is mounted on the water supply case 60. The control valve 80 may be configured to block the water supply to the water bottle 72 when the water bottle sensor 74 detects that the water bottle 72 is not mounted on the water supply case 60. That is, the control valve 80 may be configured to supply water to the water bottle 72 only when the water bottle 72 is mounted on the water supply case 60. The water bottle sensor 74 may be configured as a Hall sensor.

The control valve 80 may be configured to block the water supply to the water bottle 72 when the water level sensor 75 detects that the predetermined amount of water is stored in the water bottle 72. On the other hand, the control valve 80 may be configured to supply water to the water bottle 72 when the water level sensor 75 detects that the predetermined amount of water is not stored in the water bottle 72.

The control valve 80 may be configured to block the water supply to the water bottle 72 when the overflow sensor 76 detects that the predetermined amount of water has been collected in the tray 79.

The control valve 80 may be configured to supply water toward the water intake space 62 when a predetermined signal is input to the operation lever 64.

The water bottle sensor 74, the water level sensor 75, the overflow sensor 76, and the operation lever 64 may transmit signals to the controller 20, and the control valve 80 may control the refrigerator 1 based on a signal received from the controller 20.

Figure 7:
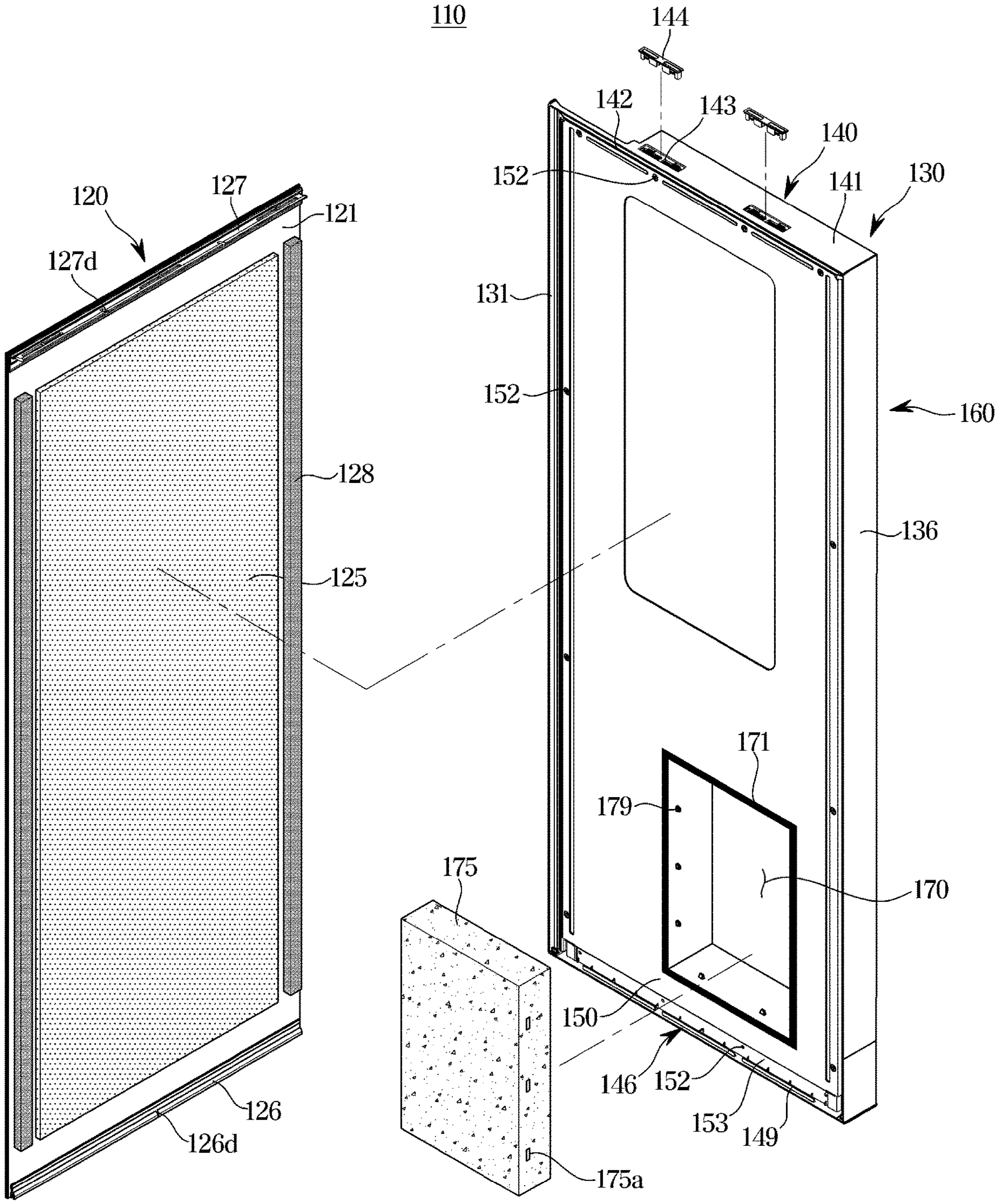
FIG. 7 illustrates a door panel separated from a door body of the outer door, according to an embodiment.
Figure 8:
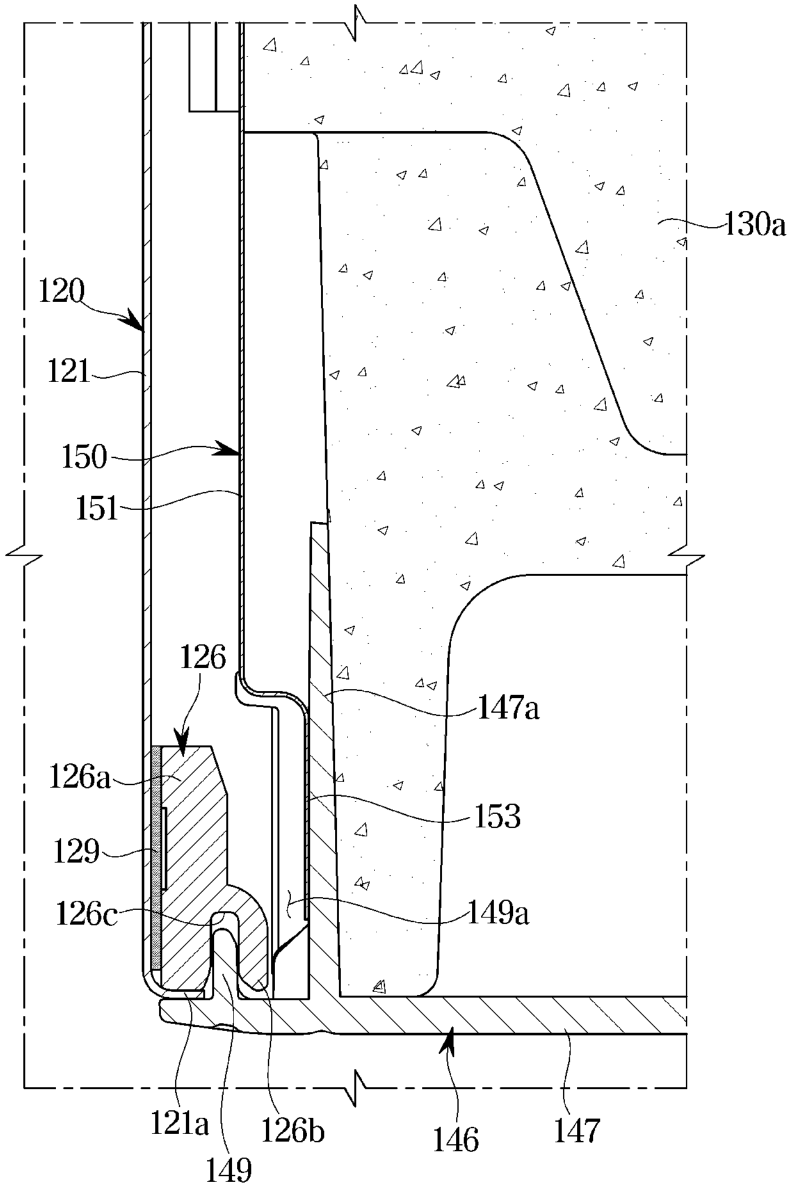
FIG. 8 illustrates a lower trim coupled to the door body, according to an embodiment.
Figure 9:
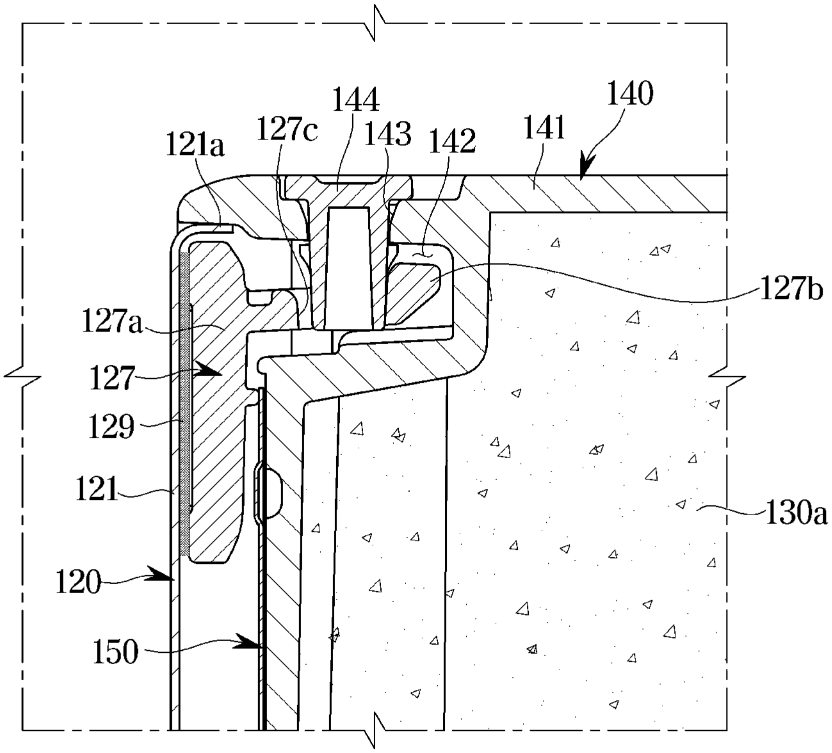
FIG. 9 illustrates an upper trim coupled to the door body, according to an embodiment.
Figure 10:
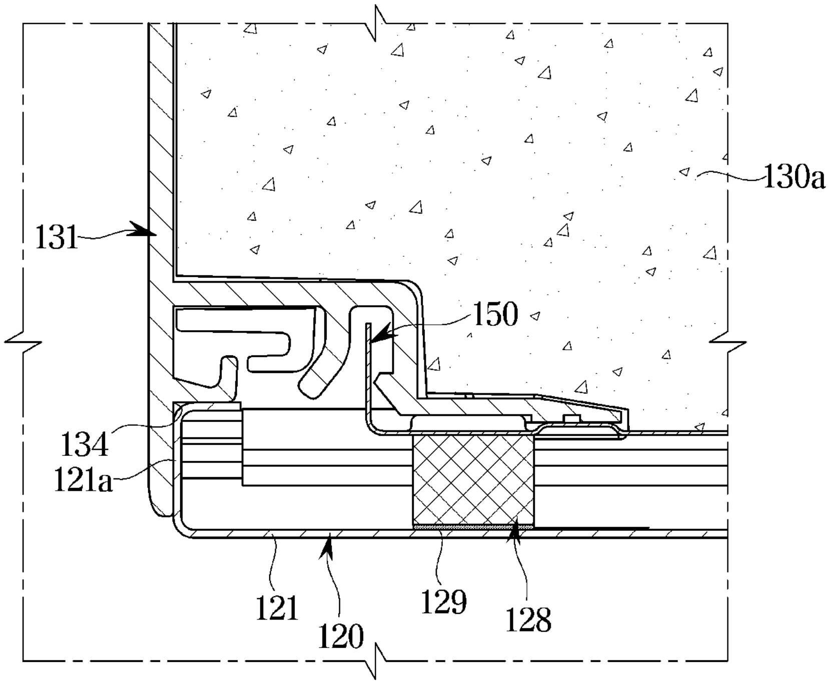
FIG. 10 illustrates a side trim coupled to the door body, according to an embodiment.

FIG. 7 illustrates a door panel separated from a door body 130 of the outer door, according to an embodiment. FIG. 8 illustrates a lower trim coupled to the door body 130, according to an embodiment. FIG. 9 illustrates an upper trim coupled to the door body 130, according to an embodiment. FIG. 10 illustrates a side trim coupled to the door body 130, according to an embodiment.

Referring to FIG. 7, the outer door 110 may include a door panel 120 and a door body 130. The door panel 120 may be detachably coupled to the door body 130.

The door panel 120 may include a panel body 121, a buffer member 125, and fixing trims 126, 127, and 128.

The panel body 121 may form a part of an outer shape of the outer door 110. The panel body 121 may have a flat shape. A front surface of the panel body 121 may be provided with various designs to meet needs of users. The fixing trims 126, 127, and 128 may be provided on a back surface of the panel body 121 to couple with the door body 130.

The panel body 121 may be made of metal such as iron. When the panel body 121 is formed of a thin steel plate, it may finish the panel body 121 such that ends of the panel body 121 are not sharp.

The ends of the panel body 121 may be bent in a direction of the door body 130, such that the ends of the panel body 121 are configured to couple to the door body 130. The bent ends of the panel body 121 may be referred to as panel bent portions **121*a***.

Specifically, the panel bent portion **121*a* of a lower end of the panel body 121 may be bent to be positioned below the lower trim 126. The panel bent portion 121*a* of the lower end of the panel body 121 may be positioned between the lower trim 126 and a front end of a lower cap body 147**.

In addition, the panel bent portion **121*a* of an upper end of the panel body 121 may be bent to be positioned above the upper trim 127. The panel bent portion 121*a* of the upper end of the panel body 121 may be positioned between the upper trim 127 and a front end of an upper cap body 141**.

In addition, the panel bent portions **121*a* of left and right sides of the panel body 121 may be positioned in chassis accommodating portions 134 of chassis 131 and 136. The chassis 131 and 136 may include the chassis accommodating portions 134 formed to accommodate the panel bent portions 121*a* of the panel body 121. The panel bent portion 121*a* may be supported by the chassis accommodating portion 134 when the door panel 120 is coupled to the door body 130**.

The panel body 121 may have a thickness of a predetermined size or more. Specifically, the panel body 121 may be made of glass. When the panel body 121 has the thickness of the predetermined size or more, the ends of the panel body 121 may be finished so as not to be sharp.

The chassis 131 and 136 may be provided to include the chassis accommodating portions 134 even when the panel body 121 of the door panel 120 includes glass. That is, the chassis 131 and 136 including the chassis accommodating portions 134 may be compatible with various types of the door panels 120.

The buffer member 125 may be disposed on the back surface of the panel body 121. The buffer member 125 may be disposed in a space formed between the door panel 120 and the door body 130. The buffer member 125 may be configured to prevent an impact from being transmitted from the door panel 120 to the door body 130. In addition, the buffer member 125 may be configured to absorb noise that may be generated from the door panel 120. The buffer member 125 may include a cushioning material and/or a sound absorbing material. The buffer member 125 may include expanded polystyrene.

The fixing trims 126, 127, and 128 may include the lower trim 126, the upper trim 127, and the side trims 128. The fixing trims 126, 127, and 128 may attach to the panel body 121 through an adhesive 129 (see FIGS. 7 to 10). The fixing trims 126, 127, and 128 may be adhered to the panel body 121 using a polyurethane reactive (PUR) adhesive method. However, the fixing method of the fixing trims 126, 127, and 128 is not limited thereto. By the fixing trims 126, 127, and 128, the door panel 120 may be firmly coupled to the door body 130, and may be easily separated therefrom.

Specifically, referring to FIGS. 7 and 8, the lower trim 126 may include a lower trim body **126*a*, a lower trim protrusion 126*b*, a lower trim groove 126*c*, and a lower trim segmental portion 126*d*. The lower trim 126 may be referred to as the first trim 126. The lower trim 126 may be disposed on a lower edge of the panel body 121**.

The lower trim body 126*a* may extend in a substantially horizontal direction to be fixed to the lower end of the panel body 121. The lower trim body 126*a* may have a substantially rectangular plate shape. The lower trim body 126*a* may be fixed to the panel body 121 through the adhesive 129.

The lower trim protrusion 126*b* may protrude rearward from the lower trim body 126*a*. The lower trim protrusion 126*b* may be provided to form the lower trim groove 126*c* between the lower trim body 126*a* and the lower trim protrusion 126*b*. The lower trim protrusion 126*b* may have a shape of extending rearward from the lower trim body 126*a* by a predetermined length and then extending substantially in a vertical direction.

The lower trim groove 126*c* may be formed between the lower trim protrusion 126*b* and the lower trim body 126*a*. The lower trim groove 126*c* may be provided to accommodate a lower cap protrusion 149 of a lower door cap 146. The lower trim groove 126*c* may be provided to correspond to a size and/or shape of the lower cap protrusion 149. As the lower cap protrusion 149 is inserted into the lower trim groove 126*c*, the lower end of the panel body 121 may be fixed to the door body 130.

The lower trim segmental portion 126*d* may be formed on the lower trim protrusion 126*b*. The lower trim segmental portion 126*d* may separate the lower trim protrusion 126*b* into a plurality of parts. The parts of the lower trim protrusion 126*b* separated by the lower trim segmental portion 126*d* may be spaced apart from each other along a direction in which the lower trim protrusion 126*b* extends. FIG. 7 illustrates that the one lower trim segmental portion 126*d* is provided, but the number of lower trim segmental portions 126*d* is not limited thereto. As the lower trim segmental portion 126*d* separates the lower trim protrusion 126*b* into the plurality of parts, when the panel body 121 is deformed by heat, the lower trim 126 may be prevented from being damaged by a deforming force applied to the lower trim 126.

Referring to FIGS. 7 and 9, the upper trim 127 may include an upper trim body 127*a*, an upper trim protrusion 127*b*, and an upper trim hole 127*c*. The upper trim 127 may be referred to as the second trim 127. The upper trim 127 may be disposed on an upper edge of the panel body 121.

The upper trim body 127*a* may extend in the substantially horizontal direction to be fixed to the upper end of the panel body 121. The upper trim body 127*a* may have a substantially rectangular plate shape. The upper trim body 127*a* may be fixed to the panel body 121 using the adhesive 129.

The upper trim protrusion 127*b* may protrude rearward from the upper trim body 127*a*. The upper trim protrusion 127*b* may be inserted into an upper coupling space 142 of an upper door cap 140. The upper trim protrusion 127*b* may be fixedly inserted into the upper coupling space 142 by a fixing cover 144.

The upper trim hole 127*c* may be formed on the upper trim protrusion 127*b*. The upper trim hole 127*c* may be configured to allow the fixing cover 144 to be inserted therein. The upper trim hole 127*c* may be configured to allow the upper trim protrusion 127*b* to penetrate substantially vertically. When the fixing cover 144 is inserted into the upper trim hole 127*c* in a state in which the upper trim protrusion 127*b* is inserted into the upper coupling space 142, the upper end of the panel body 121 may be fixed to the door body 130.

An upper trim segmental portion 127*d* may be formed on the upper trim protrusion 127*b*. The upper trim segmental portion 127*d* may be provided to separate the upper trim protrusion 127*b* into a plurality of parts. The parts of the upper trim protrusion 127*b* separated by the upper trim segmental portion 127*d* may be spaced apart from each other along a direction in which the upper trim protrusion 127*b* extends. FIG. 7 illustrates that the two upper trim segmental portions 127*d* are provided, but the number of upper trim segmental portions 127*d* is not limited thereto. As the upper trim segmental portion 127*d* separates the upper trim protrusion 127*b* into the plurality of parts, when the panel body 121 is deformed by heat, the upper trim 127 may avoid being damaged by a deforming force applied to the upper trim 127.

Referring to FIGS. 7 and 10, the side trims 128 may be disposed at left and right ends of the panel body 121. The side trims 128 may be fixed to the panel body 121 with the adhesive 129. The adhesive 129 may be provided as a double-sided tape. The side trims 128 may be provided such that the left and right ends of the door panel 120 are firmly fixed to the door body 130 when the door panel 120 is coupled to the door body 130.

The side trim 128 may include a magnetic material. The side trim 128 may be provided such that an attractive force is generated between the side trim 128 and the cover 150 when the door panel 120 is coupled to the door body 130. The cover 150 may include metal such as steel. As the side trims 128 come into contact with and are fixed to the cover 150 by the attractive force between the side trims 128 and the cover 150, opposite side ends of the door panel 120 may be in close contact with the door body 130 and may be stably fixed.

The side trims 128 may extend in the vertical direction along left and right edges of the panel body 121. The side trim 128 may be spaced apart from the panel bent portion 121*a* of the panel body 121 by a predetermined distance.

Referring to FIG. 7, the door body 130 may include the chassis 131 and 136, the upper door cap 140, the lower door cap 146, a cover 150, and a case 160. An insulator 130*a* may be provided inside the door body 130.

The chassis 131 and 136 may include a material different from that of the upper door cap 140 and lower door cap 146. Specifically, the chassis 131 and 136 may include aluminum. The upper door cap 140 and the lower door cap 146 may include acrylonitrile butadiene styrene copolymer (ABS) resin.

The chassis 131 and 136 may include a first chassis 131 forming a left surface of the outer door 110 and a second chassis 136 forming a right surface of the outer door 110. The chassis 131 and 136 may extend in the vertical direction. Hereinafter, for convenience of explanation, only the first chassis 131 are described, and the same structure may also be applied to the second chassis 136.

Referring to FIGS. 7 and 10, the first chassis 131 may include a chassis hole. The chassis hole may be formed such that a fastening member for coupling the cover 150 may be coupled thereto. The cover 150 is aligned with respect to the first chassis 131 such that a cover hole 152 is at a position corresponding to the chassis hole, and then the fastening member may be inserted into the cover hole 152 and the chassis hole such that the cover 150 may be fixed to the first chassis 131.

The upper door cap 140 may be coupled to upper ends of the chassis 131 and 136. The upper door cap 140 may form an upper surface of the outer door 110. The upper door cap 140 may include the upper cap body 141.

The upper coupling space 142 may be formed in the upper cap body 141. The upper coupling space 142 may be formed to be recessed on one surface facing the door panel 120. The upper coupling space 142 may be provided to accommodate a portion of the upper trim 127.

A passing hole 143 may be formed on an upper surface of the upper cap body 141. Specifically, the passing hole 143 may be formed to communicate with the upper coupling space 142 and the outside when the fixing cover 144 is not mounted. The fixing cover 144 may be inserted into the upper coupling space 142 through the passing hole 143 and then coupled to the upper trim hole 127*c* of the upper trim 127. In a state in which the fixing cover 144 is inserted into the upper coupling space 142, the passing hole 143 may be covered by the fixing cover 144. The fixing cover 144 may be detachably mounted on the upper cap body 141.

An upper cap hole may be formed on the upper cap body 141. The upper cap hole may be coupled to the cover 150 by a fastening member. The cover 150 is aligned with respect to the upper door cap 140 such that the cover hole 152 is at a position corresponding to the upper cap hole, and then the fastening member may be inserted into the cover hole 152 and the upper cap hole such that the cover 150 may be fixed to the upper door cap 140.

The lower door cap 146 may be coupled to lower ends of the chassis 131 and 136. The lower door cap 146 may form a bottom surface of the outer door 110. The lower door cap 146 may include the lower cap body 147.

The lower cap protrusion 149 may be formed on the lower cap body 147. The lower cap protrusion 149 may protrude upward from the bottom surface of the lower cap body 147. The lower cap protrusion 149 may be inserted into the lower trim groove 126*c* of the lower trim 126.

The lower cap body 147 may include an installation guide 147*a* provided to protrude upward from the bottom surface. The installation guide 147*a* may be spaced apart from the lower cap protrusion 149 by a predetermined distance. The installation guide 147*a* may be provided to guide the lower trim 126 of the door panel 120 to an installation position when the door panel 120 is mounted on the door body 130.

A mounting space 149*a* may be formed between the installation guide 147*a* and the lower cap protrusion 149. Through the mounting space 149*a*, in a state in which a lower end of the door panel 120 is positioned adjacent to the lower cap protrusion 149, the door panel 120 may be rotated such that the lower cap protrusion 149 is inserted into the lower trim groove 126*c*. Accordingly, the door panel 120 may be fixed to the door body 130.

A lower cap hole may be formed on the lower cap body 147. The lower cap hole may be coupled to the cover 150 by a fastening member. The cover 150 is aligned with respect to the lower door cap 146 such that the cover hole 152 is at a position corresponding to the lower cap hole, and then the fastening member may be inserted into the cover hole 152 and the lower cap hole such that the cover 150 may be fixed to the lower door cap 146.

The chassis 131 and 136, the upper door cap 140, and the lower door cap 146 may form the upper, lower, left, and right surfaces of the outer door 110. The chassis 131 and 136, the upper door cap 140, and the lower door cap 146 may be collectively referred to as a door frame. The door frame may have a shape of being open at the front and back sides. The chassis 131 and 136, the upper door cap 140, and the lower door cap 146 may be provided to be detachable, and unlike this, the chassis 131 and 136, the upper door cap 140, and the lower door cap 146 may be formed integrally. That is, the door frame may be formed integrally.

The cover 150 may be mounted on the door frame to cover an open front of the door frame. The cover 150 may include a cover body 151.

The cover body 151 may include the cover hole 152 through which a fastening member passes when the cover 150 is coupled to the chassis 131 and 136, the upper door cap 140, and the lower door cap 146. The fastening member may pass through the cover hole 152 and couple to the chassis 131 and 136, the upper door cap 140, and the lower door cap 146, respectively, and edge portions of the cover body 151 may be fixed to the chassis 131 and 136, the upper door cap 140, and the lower door cap 146, respectively.

A bent portion 153 may be provided at a lower end of the cover body 151. The bent portion 153 may be formed to be bent rearward from the cover body 151. The bent portion 153 may be provided to form a step with the cover body 151. The bent portion 153 may form the mounting space 149*a* together with the lower cap protrusion 149 and the installation guide 147*a*. The cover hole 152 may be formed on the bent portion 153 to couple to the lower door cap 146.

The case 160 may be mounted on the door frame to cover an open back side of the door frame.

The door body 130 may include the dispenser opening 170 formed to expose the dispenser 61 provided in the inner door 100 when the outer door 110 is latched to the inner door 100.

The door body 130 may include a panel gasket 171 provided on a surface facing the door panel 120. The panel gasket 171 may extend along the circumference of the dispenser opening 170.

The door body 130 may include a dispenser insulator 175 configured to be detachably inserted into the dispenser opening 170. The dispenser insulator 175 may be made of urethane. The dispenser insulator 175 may further include a vacuum insulator.

The dispenser insulator 175 may be a slightly larger size than the dispenser opening 170. Accordingly, the dispenser insulator 175 may be fitted into the dispenser opening 170 without a separate structure.

The dispenser insulator 175 may include an accommodating groove 175*a* corresponding to a body coupling portion 179. The accommodating groove 175*a* may accommodate the body coupling portion 179 when the dispenser insulator 175 is inserted into the dispenser opening 170. Accordingly, the dispenser insulator 175 may prevent cold air from leaking out of the door interior space 56.

The dispenser opening 170 may be configured to expose the dispenser 61 and the water bottle 72 when the outer door 110 is latched to the inner door 100.

A process of assembling the door panel 120 of the outer door 110 illustrated in FIG. 7 to the door body 130 will be described below.

First, the door frame is formed by coupling the upper door cap 140 and lower door cap 146 to the upper and lower ends of the chassis 131 and 136, respectively. The door body 130 is formed by coupling the cover 150 and the case 160 on the front and back sides of the door frame, respectively.

The door panel 120 may be aligned such that the lower trim 126 faces the lower cap protrusion 149 of the door body 130. The door panel 120 may be positioned to extend from the lower cap protrusion 149 toward the upper front. The door panel 120 may be rotated such that the lower cap protrusion 149 is inserted into the lower trim groove 126*c* in a state in which an end of the lower cap protrusion 149 is aligned with an entrance of the lower trim groove 126*c*. The door panel 120 may be coupled to the door body 130 while being rotated in a clockwise direction illustrated in FIG. 8. As the mounting space 149*a* is formed in the lower door cap 146, the door panel 120 may couple to and rotate with respect to the door body 130.

As the door panel 120 is coupled to and rotates with respect to the door body 130, the side trim 128 may be fixed to the cover 150 by a magnetic force. The side trim 128 may be sequentially fixed to the cover 150 from a lower end to an upper end.

In a state in which the side trim 128 is fixed to the cover 150, the upper trim protrusion 127*b* of the upper trim 127 may be inserted into the upper coupling space 142. When the upper trim protrusion 127*b* is inserted into the upper coupling space 142, the fixing cover 144 may be inserted into the upper trim hole 127*c* through the passing hole 143, such that the fixing cover 144 is coupled to the passing hole 143 and the upper trim hole 127*c*. In a state in which the fixing cover 144 is coupled to the passing hole 143 and the upper trim hole 127*c*, the door panel 120 may be fixed to the upper door cap 140.

As the above-described process proceeds in reverse, the door panel 120 may be separated from the door body 130.

Through the above-described processes, the door panel 120 may be coupled to or separated from the door body 130 in the refrigerator 1 according to an embodiment of the present disclosure.

Figure 11:
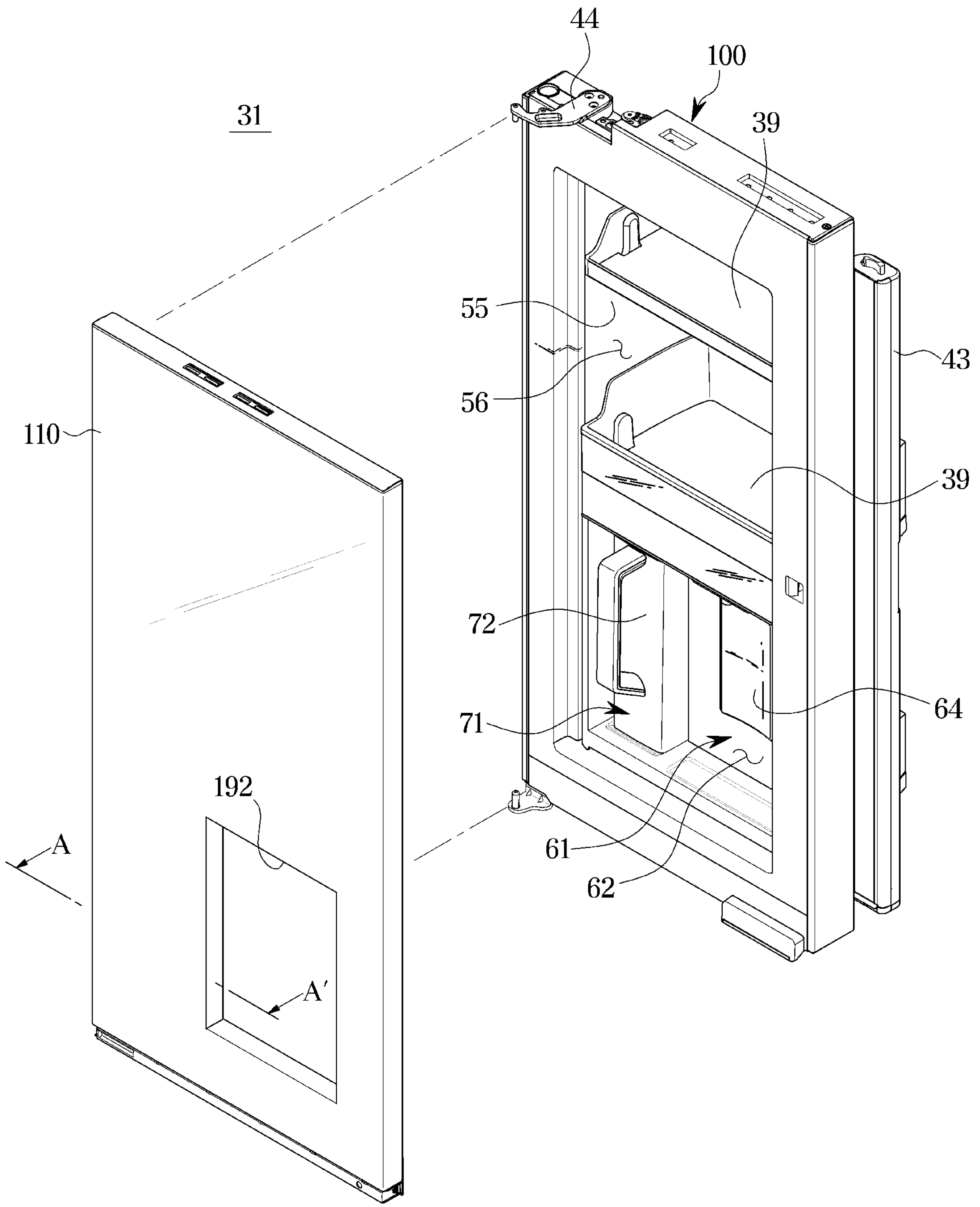
FIG. 11 illustrates an outer door and an inner door, according to an embodiment.
Figure 12:
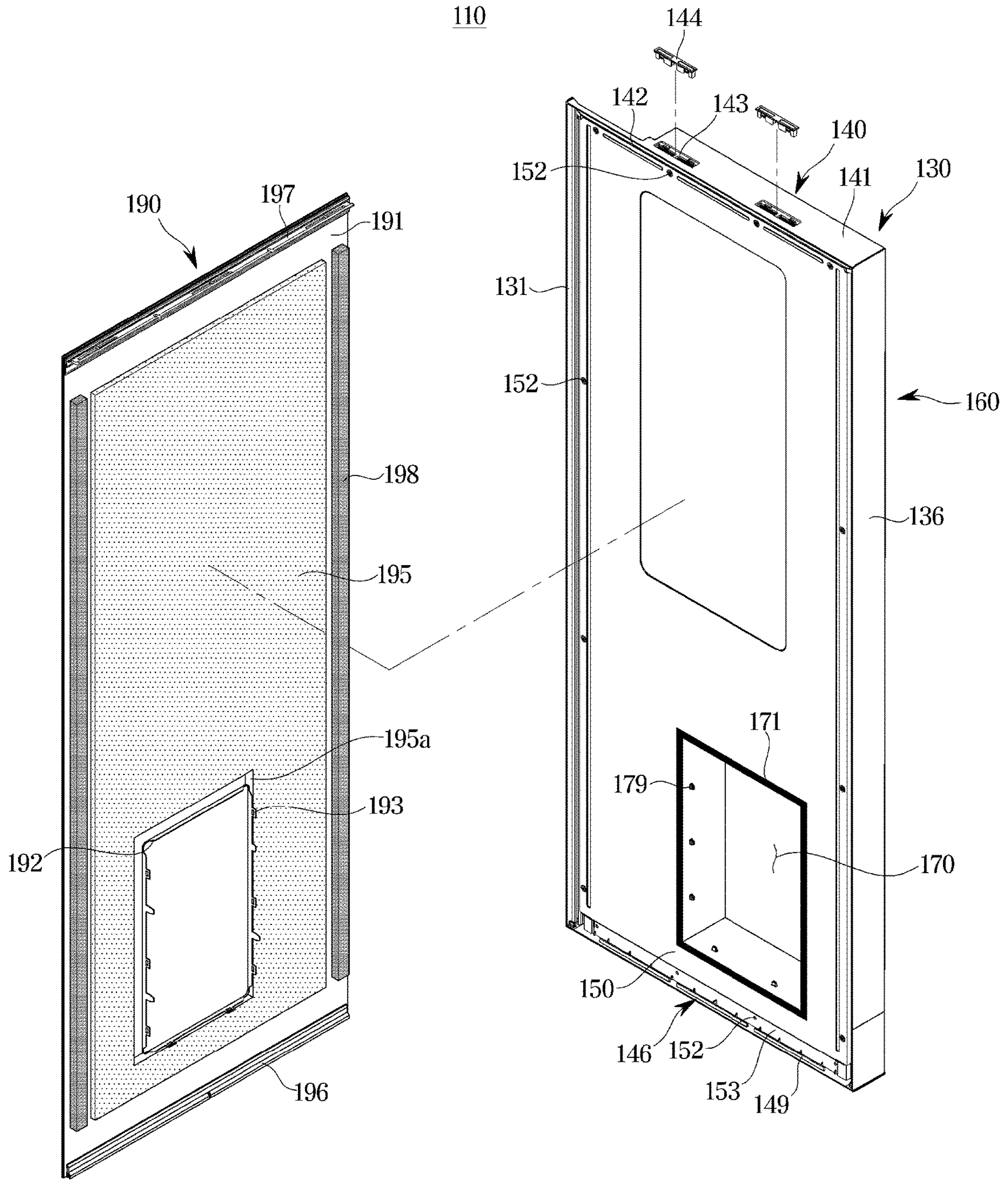
FIG. 12 illustrates a door panel separated from a door body of the outer door illustrated in FIG. 11, according to an embodiment.
Figure 13:
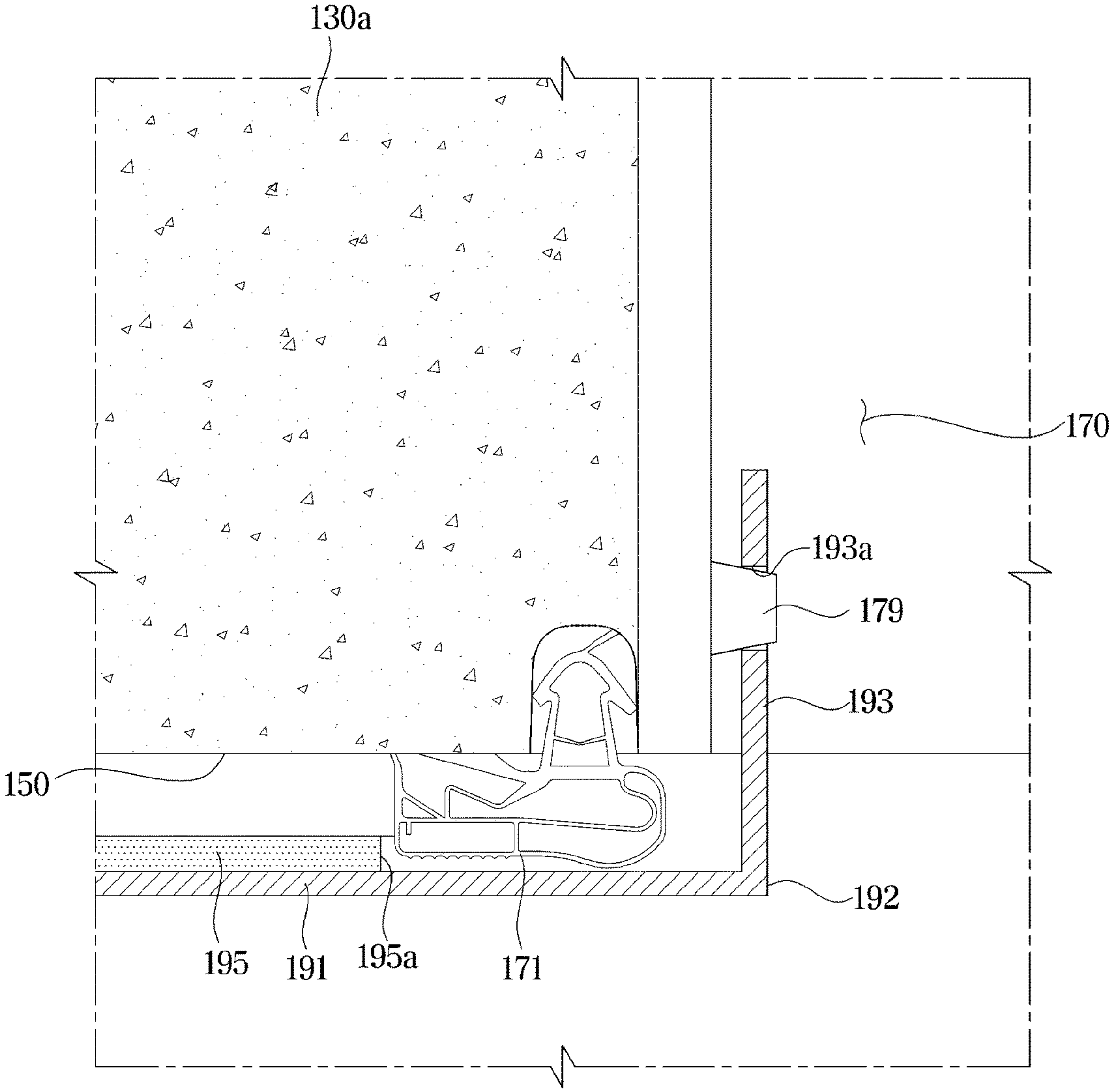
FIG. 13 illustrates a cross section taken along line A-A' indicated in FIG. 11, according to an embodiment.

FIG. 11 illustrates an outer door and an inner door, according to an embodiment. FIG. 12 illustrates a door panel separated from a door body of the outer door illustrated in FIG. 11, according to an embodiment. FIG. 13 illustrates a cross section taken along line A-A' indicated in FIG. 11, according to an embodiment.

Referring to FIGS. 11 and 12, depending on needs of a user, a door panel 190 including a panel opening 192 formed to expose the dispenser 61 may be mounted on the door body 130 in the refrigerator 1 according to an embodiment. That is, in the refrigerator 1 according to an embodiment of the present disclosure, in a case in which the user wants to cover the dispenser 61 when the outer door 110 is closed, the dispenser 61 may be used in a state in which the dispenser insulator 175 is mounted on the door body 130 and the door panel 120 illustrated in FIG. 7 is coupled to the door body 130, and in a case in which the user wants to expose the dispenser 61 when the outer door 110 is closed, the dispenser 61 may be used in a state in which the door panel 190 illustrated in FIG. 11 is coupled to the door body 130.

Specifically, referring to FIG. 12, the door panel 190 may include a panel body 191, a buffer member 195, and fixed trims 196, 197, and 198. Detailed description of parts of the door panel 190 illustrated in FIG. 12, which are the same as the parts of the door panel 120 illustrated in FIG. 7, may be omitted.

The panel body 191 may form a part of the outer shape of the outer door 110. The panel body 191 may have a flat shape. A front surface of the panel body 191 may be provided with various designs to meet needs of the users. The fixing trims 196, 197, and 198 for being coupled with the door body 130 may be provided on a back surface of the panel body 191.

The panel body 191 may be made of metal such as iron. The panel body 191 may have a thickness of a predetermined size or more. Specifically, the panel body 191 may be made of glass. When the panel body 191 has the thickness of the predetermined size or more, ends of the panel body 191 may be finished so as not to be sharp.

The panel body 191 may include the panel opening 192 formed to expose the dispenser 61. The panel opening 192 may correspond to the dispenser opening 170.

The panel body 191 may include an opening coupling portion 193 provided along an edge of the panel opening 192. The opening coupling portion 193 may extend from the panel opening 192 toward the door body 130.

Referring to FIG. 13, the opening coupling portion 193 may include a coupling groove 193*a*. The coupling groove 193*a* may be coupled to the body coupling portion 179 formed in the dispenser opening 170 of the door body 130. Specifically, while the door panel 190 is mounted on the door body 130, the opening coupling portion 193 moves to an inside of the dispenser opening 170. The opening coupling portion 193 moved to the inside of the dispenser opening 170 contacts the body coupling portion 179. The opening coupling portion 193 connects to the body coupling portion 179, and the door panel 190 is mounted on the door body 130. When the door panel 190 is mounted on the door body 130, the body coupling portion 179 is coupled to the opening coupling portion 193. Specifically, the body coupling portion 179 is provided in the shape of a protrusion and may be inserted into the coupling groove 193*a* formed in the opening coupling portion 193. According to this configuration, when the door panel 190 is coupled to the door body 130, a portion where the panel opening 192 is formed may be fixed to the door body 130.

When the door panel 190 is coupled to the door body 130, the panel gasket 171 is positioned along a circumference of the panel opening 192. The panel gasket 171 contacts the portion of the panel body 191 where the panel opening 192 is formed.

The buffer member 195 may be disposed on the back surface of the panel body 191. The buffer member 195 may be disposed in a space formed between the door panel 190 and the door body 130. The buffer member 195 may be configured to prevent an impact from being transmitted to the door body 130 when the impact is applied to the door panel 190. In addition, the buffer member 195 may be configured to absorb noise that may be generated from the door panel 190. The buffer member 195 may be configured to include a cushioning material and/or a sound absorbing material. The buffer member 195 may include expanded polystyrene.

The buffer member 195 may include a buffer member opening 195*a*. The buffer member opening 195*a* may be larger than the panel opening 192. The buffer member opening 195*a* may surround the panel opening 192. A space, in which the panel gasket 171 may be attached, may be provided between the panel opening 192 and the buffer member opening 195*a*.

The fixing trims 196, 197, and 198 may include the lower trim 196, the upper trim 197, and the side trims 198. By the fixing trims 196, 197, and 198, the door panel 190 may be firmly coupled to the door body 130, and may be easily separated therefrom.

The lower trim 196 may be referred to as the first trim 196. The lower trim 196 may be disposed at a lower edge of the panel body 191.

The upper trim 197 may be referred to as the second trim 197. The upper trim 197 may be disposed at an upper edge of the panel body 191.

The side trims 198 may be disposed at left and right ends of the panel body 191. The side trims 198 may be provided such that the left and right ends of the door panel 190 are firmly fixed to the door body 130 when the door panel 190 is coupled to the door body 130.

The side trim 198 may include a magnetic material. The side trim 198 may be provided such that an attractive force is generated between the side trim 198 and the cover 150 when the door panel 190 is coupled to the door body 130. The cover 150 may include metal such as steel. As the side trims 198 come into contact with and are fixed to the cover 150 by the attractive force between the side trims 198 and the cover 150, opposite side ends of the door panel 190 may contact the door body 130 and may be stably fixed thereto.

The side trims 198 may extend in the vertical direction along left and right edges of the panel body 191.

In the refrigerator 1, according to an embodiment, because the dispenser 61 and the automatic water supply device 71 are provided in the inner door 100, usability thereof may be improved. In addition, in the refrigerator 1 according to an embodiment because the door panel 120 is detachably coupled to the door body 130 of the outer door 110, the design of the door may be easily changed depending on needs of the users.

In addition, in the refrigerator 1, according to an embodiment, depending on needs of the users, the dispenser 61 provided on the inner door 100 may be exposed to the outside or may not to be exposed to the outside. Specifically, if the user wants to use the dispenser 61 in a non-exposed state when the outer door 110 is closed, the dispenser 61 may be used in a state in which the dispenser insulator 175 illustrated in FIG. 7 is mounted on the door body 130, and the door panel 120 illustrated in FIG. 7 is mounted on the door body 130. In a case in which the user wants to use the dispenser 61 in an exposed state when the outer door 110 is closed, the dispenser 61 may be used in a state in which the dispenser insulator 175 illustrated in FIG. 7 is separated from the door body 130, and the door panel 190 illustrated in FIG. 12 is mounted on the door body 130.

Figure 14:
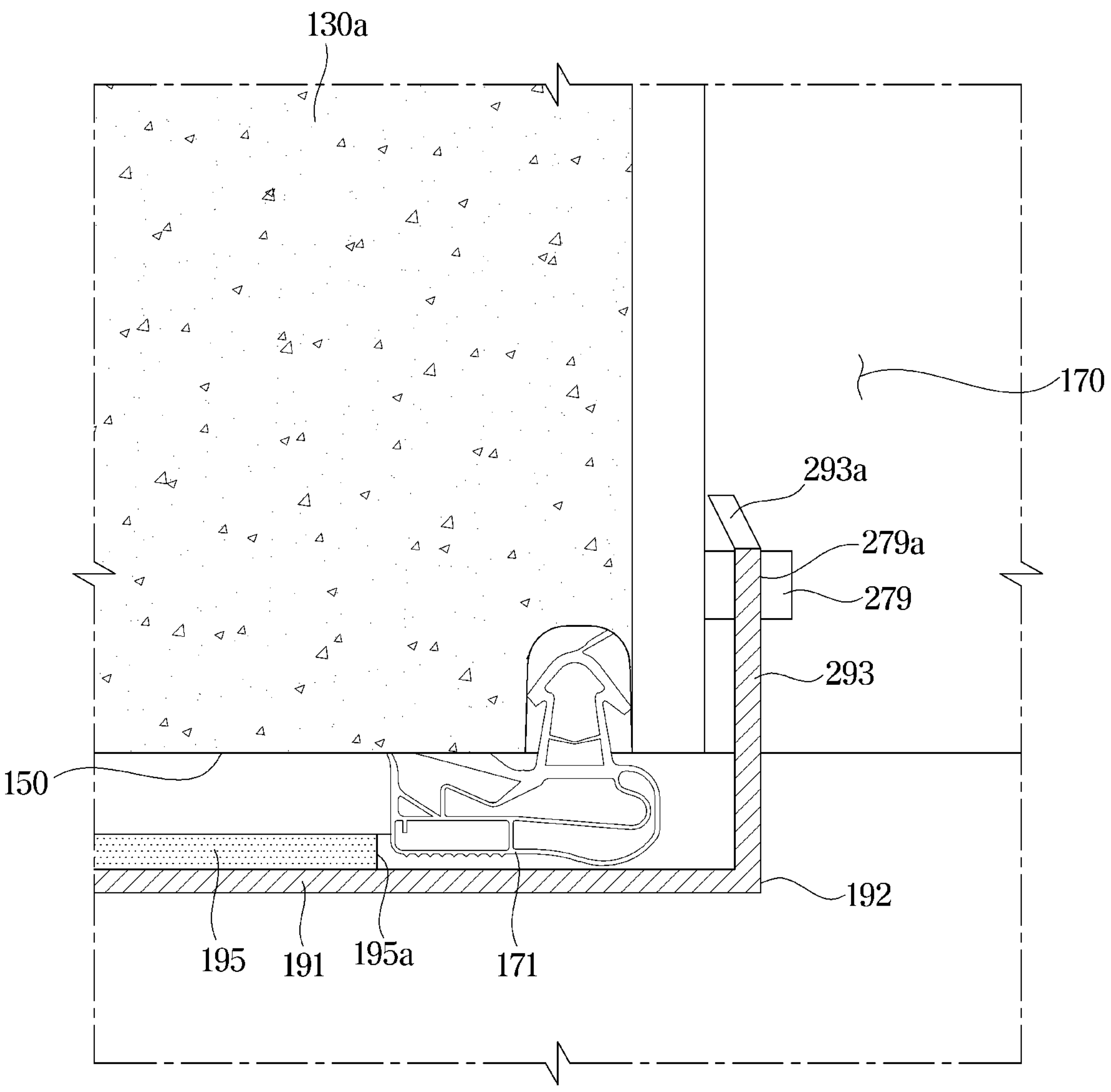
FIG. 14 illustrates a coupling structure between a panel body and a dispenser opening, according to an embodiment.

FIG. 14 illustrates a coupling structure between a panel body 191 and a dispenser opening 170, according to an embodiment.

A coupling structure between the panel body 191 and the dispenser opening 170 according to an embodiment are described below with reference to FIG. 14. Configurations that are the same as those illustrated in FIG. 13 may be assigned the same reference numerals, and detailed descriptions thereof may be omitted.

Referring to FIG. 14, an opening coupling portion 293 may be provided in a portion of the panel body 191 where the panel opening 192 is formed, according to an embodiment. The opening coupling portion 293 may include a deformation portion 293*a* configured to be deformable. The deformation portion 293*a* may be provided at an end of the opening coupling portion 293. The deformation portion 293*a* may include a deformable material.

A body coupling portion 279 may be provided on an inner circumferential surface of the dispenser opening 170. The body coupling portion 279 may include a coupling hole 279*a* such that the opening coupling portion 293 may be inserted therein.

When the door panel 190 is coupled to the door body 130, the opening coupling portion 293 may move to the inside of the dispenser opening 170. The opening coupling portion 293 may be inserted into the coupling hole 279*a* of the body coupling portion 279 provided on the inner circumferential surface of the dispenser opening 170. As the deformation portion 293*a* is bent in a state in which the opening coupling portion 293 is inserted into the coupling hole 279*a* of the body coupling portion 279, the door panel 190 may be fixed to the door body 130 such that the door panel 190 is not separated from the door body 130.

Figure 15:
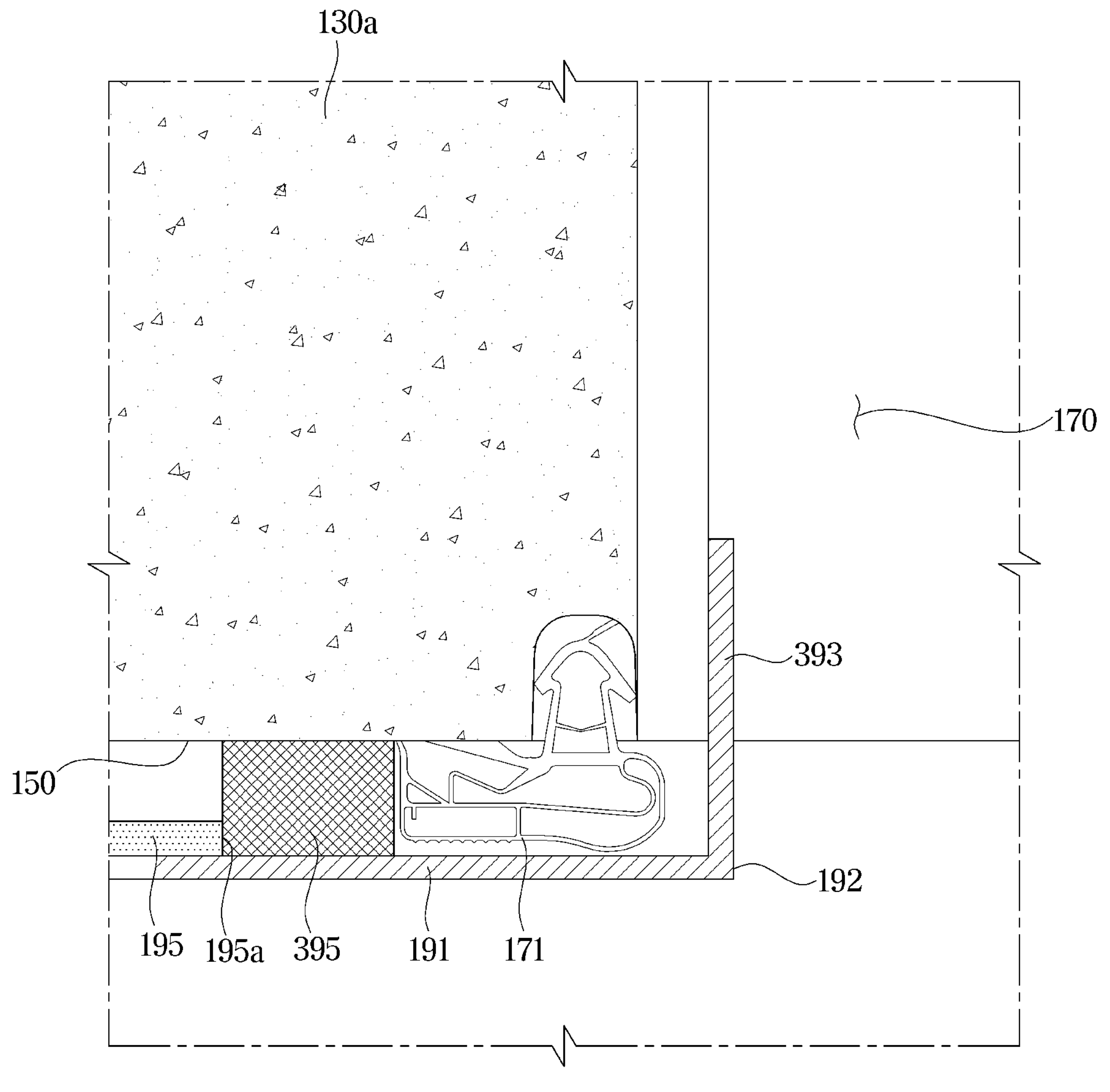
FIG. 15 illustrates a coupling structure between a panel body and a dispenser opening, according to an embodiment.

FIG. 15 illustrates a coupling structure between a panel body and a dispenser opening according to an embodiment.

A coupling structure between the panel body 191 and the dispenser opening 170 according to an embodiment of the present disclosure will be described below with reference to FIG. 15. Configurations that are the same as those illustrated in FIG. 13 may be assigned the same reference numerals, and detailed descriptions thereof may be omitted.

Referring to FIG. 15, the door panel may include an opening coupling portion 395 extending along an edge of the panel opening and made of a magnetic material. The opening coupling portion 395 may be positioned between the buffer member 195 and the panel gasket 171 when the door panel 190 is mounted on the door body 130.

The cover 150 may be provided such that the opening coupling portion 395 is fixed by a magnetic force. The cover 150 may include metal such as steel.

A bent portion 393 forming the opening of the panel body 191 may contact the inner circumferential surface of the dispenser opening 170.

According to an embodiment, a refrigerator includes a door panel detachably mounted on a door body, such that a design of a door can be easily changed.

According to an embodiment, in the refrigerator, an edge of the door panel is coupled to and fixed to the door body, such that the edge of the door panel can be prevented from being separated from the door body.

According to an embodiment, the refrigerator is equipped with an automatic water supply device to supply water to a water bottle until the water bottle is filled with a predetermined amount of water when a dispenser and a water bottle are mounted and manipulate an operation lever, such that usability thereof can be improved.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A refrigerator comprising:
- a main body comprising a storage compartment;
- an inner door rotatably coupled to the main body;
- an outer door rotatably coupled to a front of the inner door;
- a dispenser provided in the inner door and configured to supply water; and
- a water supply device provided in the inner door, and configured to supply a predetermined amount of water to a container, the water supply device comprising a sensor configured to detect a level of the water in the container,
- wherein the outer door comprises:
  - a door body comprising a dispenser opening configured to expose the dispenser in a state in which the outer door at least partially covers the inner door; and
  - a door panel forming part of an outer shape of the door body and comprising a panel opening corresponding to the dispenser opening, the door panel being configured to be detachably mounted on the door body.

2. The refrigerator according to claim 1, wherein the door panel is configured to at least partially cover the dispenser opening.

3. The refrigerator according to claim 2, wherein the outer door further comprises a dispenser insulator removably provided in the dispenser opening.

4. The refrigerator according to claim 1, wherein the door body further comprises a body coupling portion provided on an inner circumferential surface of the dispenser opening and having a coupling hole, and wherein the door panel further comprises an opening coupling portion comprising a deformable material and configured to be inserted into the coupling hole in a state in which the door panel is mounted on the door body.

5. The refrigerator according to claim 1, wherein the door panel further comprises an opening coupling portion extending along an edge of the panel opening and comprising a magnetic material, and wherein the door body further comprises a cover, the opening coupling portion being fixed to the cover by a magnetic force.

6. The refrigerator according to claim 1, wherein the door body further comprises a dispenser gasket provided on a surface facing the inner door along an edge of the dispenser opening.

7. The refrigerator according to claim 1, wherein the door body further comprises a panel gasket on a surface facing the door panel along an edge of the dispenser opening.

8. The refrigerator according to claim 1, wherein the dispenser and the water supply device are accessible in a state in which the outer door is opened and the inner door is closed.

9. The refrigerator according to claim 1, further comprising a control valve configured to guide water supplied from an external source to the dispenser or to the water supply device.

10. The refrigerator according to claim 1, further comprising:

a tray configured to collect water overflowing from the container; and an overflow sensor configured to detect a water level of the tray.

11. The refrigerator according to claim 1, wherein the door panel comprises an upper trim protruding toward the door body, and wherein the door body further comprises an upper coupling space configured to accommodate the upper trim in a state in which the door panel is mounted on the door body.

12. The refrigerator according to claim 11, wherein the outer door further comprises a fixing cover configured to be coupled to the upper trim in the upper coupling space in the state in which the door panel is mounted on the door body.

13. The refrigerator according to claim 12, wherein the fixing cover is detachably coupled to the outer door.

14. A refrigerator comprising:

a main body comprising a storage compartment;

an inner door rotatably coupled to the main body;

an outer door rotatably coupled to a front of the inner door;

a dispenser provided in the inner door and configured to supply water; and a water supply device provided in the inner door, and configured to supply a predetermined amount of water to a container, the water supply device comprising a sensor configured to detect a level of the water in the container, wherein the outer door comprises:

a door body comprising a dispenser opening configured to expose the dispenser in a state in which the outer door at least partially covers the inner door; and a door panel detachably mounted on the door body, wherein the door panel comprises a panel opening corresponding to the dispenser opening, wherein the door body further comprises a body coupling portion provided on an inner circumferential surface of the dispenser opening, and wherein the door panel further comprises an opening coupling portion comprising a coupling groove configured to accommodate the body coupling portion in a state in which the door panel is mounted on the door body.

* * * * *